(12) United States Patent
Goto et al.

(10) Patent No.: US 9,065,148 B2
(45) Date of Patent: Jun. 23, 2015

(54) NEGATIVE ELECTRODE ACTIVE MATERIAL FOR LITHIUM ION SECONDARY BATTERY AND METHOD FOR PRODUCING THE SAME

(75) Inventors: Natsumi Goto, Hyogo (JP); Takashi Takeuchi, Osaka (JP); Masaki Hasegawa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 273 days.

(21) Appl. No.: 13/371,032

(22) Filed: Feb. 10, 2012

(65) Prior Publication Data

US 2012/0214069 A1 Aug. 23, 2012

Related U.S. Application Data

(60) Provisional application No. 61/442,966, filed on Feb. 15, 2011.

(51) Int. Cl.
| | |
|---|---|
| *H01M 4/02* | (2006.01) |
| *H01M 4/04* | (2006.01) |
| *H01M 4/36* | (2006.01) |
| *H01M 4/48* | (2010.01) |
| *H01M 4/50* | (2010.01) |
| *H01M 10/0525* | (2010.01) |
| *H01M 4/1391* | (2010.01) |
| *H01M 4/131* | (2010.01) |

(Continued)

(52) U.S. Cl.
CPC ........ *H01M 10/0525* (2013.01); *H01M 4/1391* (2013.01); *H01M 4/131* (2013.01); *H01M 4/366* (2013.01); *H01M 4/485* (2013.01); *H01M 4/505* (2013.01); *Y02E 60/122* (2013.01); *Y02T 10/7011* (2013.01)

(58) Field of Classification Search
USPC ........ 429/209–246; 29/623.1–623.5; 361/305
See application file for complete search history.

(56) References Cited

U.S. PATENT DOCUMENTS

| | | |
|---|---|---|
| 6,372,384 B1 | 4/2002 | Fujimoto et al. |
| 2004/0201948 A1 | 10/2004 | Hosoya et al. |

(Continued)

FOREIGN PATENT DOCUMENTS

| | | |
|---|---|---|
| JP | 10-251020 A | 9/1998 |
| JP | 2000-156229 | 6/2000 |

(Continued)

OTHER PUBLICATIONS

Machine Translation of Hiroshi et al. (JP 2003-297433, published Oct. 2003, pp. 1-9).*

(Continued)

*Primary Examiner* — Basia Ridley
*Assistant Examiner* — Caitlin Wilmot
(74) *Attorney, Agent, or Firm* — McDermott Will & Emery LLP

(57) ABSTRACT

A negative electrode active material for a lithium ion secondary battery contains a lithium titanium complex oxide having a composition expressed as $Li_4Ti_{5-x}Mn_xO_{12}$ (where $0<x\leq0.3$), $Li_4Ti_{5-x-y}Mn_xV_yO_{12}$ (where $0<x\leq0.3$, $0<y\leq0.05$), or $Li_4Ti_{5-x-z}Mn_xB_zO_{12}$ (where $0<x\leq0.3$, $0<z\leq0.3$).

5 Claims, 6 Drawing Sheets

(51) Int. Cl.
*H01M 4/485* (2010.01)
*H01M 4/505* (2010.01)

(56) References Cited

U.S. PATENT DOCUMENTS

| 2005/0181279 A1 | 8/2005 | Hosoya | |
|---|---|---|---|
| 2012/0015234 A1* | 1/2012 | Iwaya et al. | 429/152 |
| 2012/0045693 A1* | 2/2012 | Eom | 429/220 |
| 2012/0045696 A1* | 2/2012 | Herle | 429/322 |

FOREIGN PATENT DOCUMENTS

| JP | 2000-277116 | | 10/2000 |
|---|---|---|---|
| JP | 2001-126728 | A | 5/2001 |
| JP | 2003-217583 | A | 7/2003 |
| JP | 2003-297433 | A | 10/2003 |
| JP | 2004-319105 | | 11/2004 |
| JP | 2005-135775 | A | 5/2005 |
| JP | 2005-228706 | | 8/2005 |
| JP | 2007-305447 | A | 11/2007 |
| JP | 2010-097845 | A | 4/2010 |
| WO | WO 2006/050022 | A2 | 5/2006 |
| WO | WO 2006/050098 | A1 | 5/2006 |
| WO | WO 2006/050117 | A2 | 5/2006 |

OTHER PUBLICATIONS

Capsoni et al. (2008). Cations distribution and valence states in Mn-substituted $Li_4Ti_5O_{12}$ structure. *Chem Mater*, 20(13), 4291-4298.

Kubiak et al. (2003). Phase transition in the spinel $Li_4Ti_5O_{12}$ induced by lithium insertion: Influence of the substitutions Ti/V, Ti/Mn, Ti/Fe. *J Power Sources*,119-121, 626-630.

International Search Report issued in corresponding International Application No. PCT/JP2012/000907, pp. 1-5.

Written Opinion with Partial English Translation issued in corresponding International Application No. PCT/JP2012/000907, pp. 1-7.

Japanese Office Action, and English translation thereof, issued in Japanese Patent Application No. 2012-524987 dated Jul. 24, 2012, pp. 1-6.

* cited by examiner

NEGATIVE ELECTRODE ACTIVE MATERIAL FOR LITHIUM ION SECONDARY BATTERY AND METHOD FOR PRODUCING THE SAME

CROSS-REFERENCE TO RELATED APPLICATIONS

This application claims priority to U.S. Provisional Patent Application No. 61/442,966 filed Feb. 15, 2011, the disclosure of which is incorporated herein by reference.

BACKGROUND OF THE INVENTION

1. Field of the Invention

The present invention relates to an inorganic material used as a negative electrode active material for a lithium ion secondary battery, and a method for producing the same.

2. Description of the Related Art

In recent years, different types of lithium ion secondary batteries have been developed. Carbon materials have been conventionally used as a negative electrode active material for a lithium ion secondary battery. However, lithium titanium complex oxide materials have recently been developed and attracting public attention. For example, a lithium ion secondary battery using $LiCoO_2$ as the positive electrode active material and $Li_4Ti_5O_{12}$ as the negative electrode active material has already been put to practical use.

$Li_4Ti_5O_{12}$ is a material having a spinel crystalline structure and is capable of repeatedly absorb and release Li, and therefore $Li_4Ti_5O_{12}$ can be used as an active material for a lithium ion secondary battery. $Li_4Ti_5O_{12}$ absorbs and releases Li at a potential of about 1.5 V with respect to the standard oxidation-reduction potential of lithium ($Li/Li^+$). Therefore, it is believed that where $Li_4Ti_5O_{12}$ is used as a negative electrode active material in a lithium ion secondary battery, lithium metal is unlikely to deposit on the negative electrode even if there occurs a reaction overvoltage resulting from rapid charging, or the like, thus realizing a lithium ion secondary battery with a high degree of safety. It also offers desirable cycle characteristics because there is little lattice expansion from charging/discharging.

However, $Li_4Ti_5O_{12}$ has a low electronic conductivity. Therefore, where $Li_4Ti_5O_{12}$ is used in a lithium secondary battery, a problem remains with the output characteristics. In order to solve this problem, attempts have been made to add a different element to $Li_4Ti_5O_{12}$ to alter the property thereof. For example, Japanese Laid-Open Patent Publication No. 2000-277116 discloses a material in which a portion of Ti element of $Li_4Ti_5O_{12}$ is substituted with a different element selected from V element, Nb element, Mo element and P element for the purpose of improving the output characteristics by increasing the electronic conductivity. Japanese Laid-Open Patent Publication No. 2000-277116 reports that the electronic conductivity is increased and the discharge characteristics at high loads are improved by substituting a portion of Ti element with a different element selected from V element, Nb element, Mo element and P element. However, the discharge capacity at high loads is 83% or less that at low loads, and it cannot be said that the discharge characteristics are sufficient.

Japanese Laid-Open Patent Publication No. 2000-156229 discloses a material in which a portion of Ti element of $Li_4Ti_5O_{12}$ is substituted with a transition metal element other than Ti element. While Japanese Laid-Open Patent Publication No. 2000-156229 reports that the storage stability improves by substituting a portion of Ti element with various transition metal elements, it provides no specific reference to the output characteristics or the electrode capacity density. Also, the actual syntheses, the resulting production of intended lithium titanium complex oxides, and the property of the produced materials are only reported for cases in which the substituting element is B element, Co element or Zn element.

Japanese Laid-Open Patent Publication Nos. 2005-228706 and 2004-319105 disclose that $Li_4Ti_5O_{12}$ or $Li_4Ti_{4.90}Mn_{0.10}O_4$ can be used also as a coating material of a positive electrode active material. However, Japanese Laid-Open Patent Publication Nos. 2005-228706 and 2004-319105 provide no specific reference to the applicability or characteristics thereof as a negative electrode active material.

SUMMARY OF THE INVENTION

Embodiments of the present invention aim at solving at least one of the aforementioned problems in the art, and providing a negative electrode active material for a lithium ion secondary battery with a desirable electronic conductivity, and a method for producing the same.

The negative electrode active materials for a lithium ion secondary battery according to the embodiments of the present invention contain a lithium titanium complex oxide having a composition expressed as $Li_4Ti_{5-x}Mn_xO_{12}$ (where $0<x\le0.3$), $Li_4Ti_{5-x-y}Mn_xV_yO_{12}$ (where $0<x\le0.3$, $0<y\le0.05$) or $Li_4Ti_{5-x-z}Mn_xB_zO_{12}$ (where $0<x\le0.3$, $0<z\le0.3$). The electronic conductivity of a lithium titanium complex oxide is improved by substituting a portion of Ti element of $Li_4Ti_5O_{12}$ with Mn element.

According to the embodiments of the present invention, the electronic conductivity of a lithium titanium complex oxide is improved by substituting a portion of Ti element of $Li_4Ti_5O_{12}$ with Mn element. Therefore, by using negative electrode active materials for a lithium ion secondary battery according to the embodiments of the present invention, it is possible to realize a lithium ion secondary battery with high output characteristics.

It is possible to increase the primary particle size in addition to improving the electronic conductivity of a lithium titanium complex oxide by substituting a portion of Ti element of a composition shown above with B element or V element in addition to Mn element. Therefore, it is possible to realize a lithium ion secondary battery with high output characteristics and a large capacity density.

DETAILED DESCRIPTION OF PREFERRED EMBODIMENTS

Figure 1:
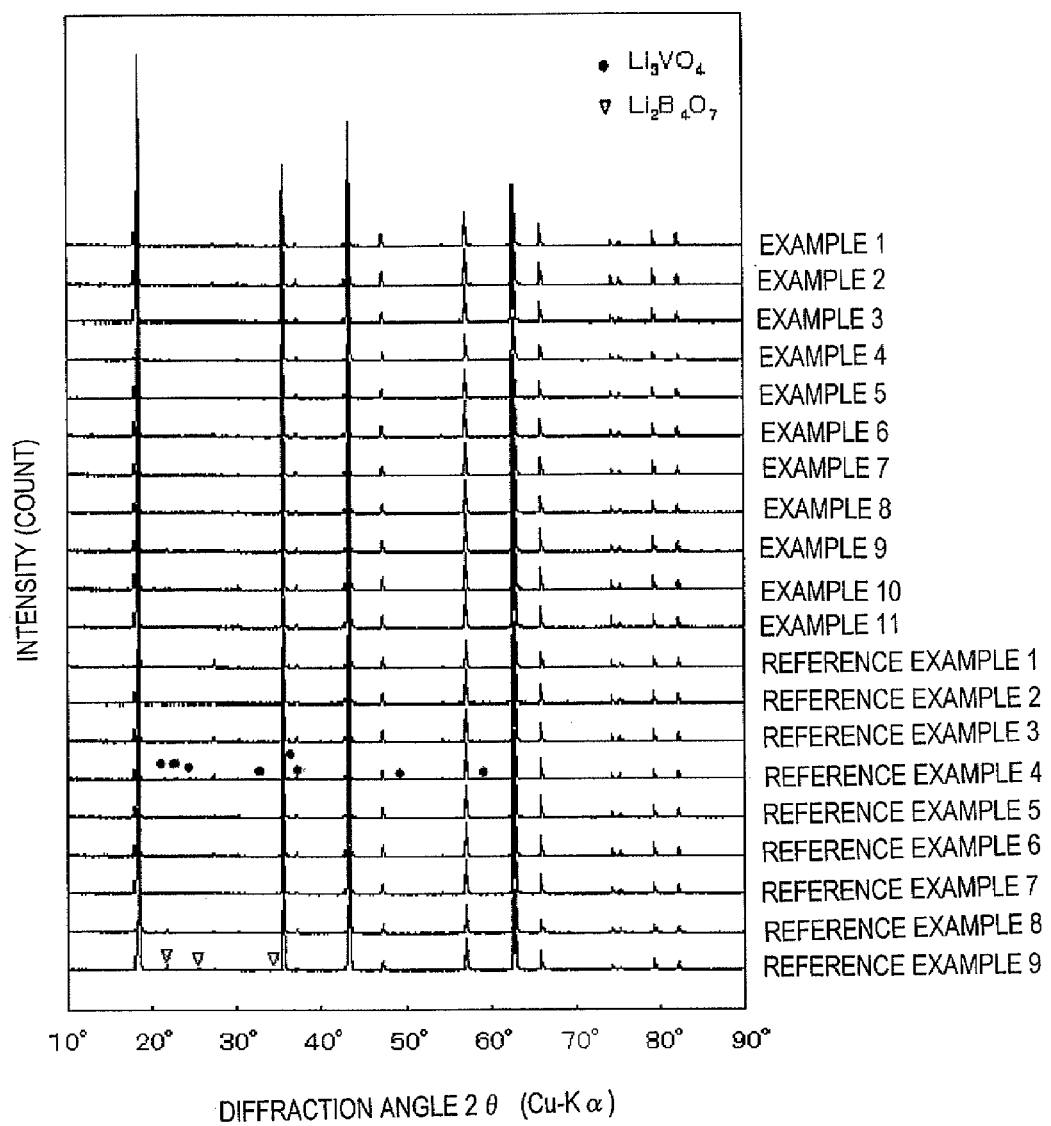
FIG. 1 shows X-ray diffraction patterns of lithium titanium complex oxides of Examples 1-11 and Reference Examples 1-9.

Negative electrode active materials for lithium ion secondary batteries according to embodiments of the present invention will now be described with reference to the drawings.

First Embodiment

A negative electrode active material for a lithium ion secondary battery according to a first embodiment of the present invention will be described. The negative electrode active material for a lithium ion secondary battery of the present embodiment contains a lithium titanium complex oxide having a composition $Li_4Ti_{5-x}Mn_xO_{12}$ (where $0<x\leq0.3$). The lithium titanium complex oxide is a compound in which a portion of Ti element of $Li_4Ti_5O_{12}$ is substituted with Mn element. In the composition, x represents the amount of substitution.

A lithium titanium complex oxide having a composition $Li_4Ti_{5-x}Mn_xO_{12}$ (where $0<x\leq0.3$) has a desirable electronic conductivity. The reason why the electronic conductivity is improved by substituting a portion of Ti element with Mn is not clear. It is nevertheless believed that by substituting the tetravalent Ti element with the trivalent Mn element, there occurs an electronic defect level, thereby changing the band-gap of the lithium titanium complex oxide. The lithium titanium complex oxide has a desirable electronic conductivity, and when it is used with a negative electrode active material for a lithium ion secondary battery, it improves the output characteristic of the lithium ion secondary battery.

A lithium titanium complex oxide having a composition expressed as $Li_4Ti_{5-x}Mn_xO_{12}$ (where $0<x\leq0.3$) has a spinel crystalline structure, and is therefore capable of irreversibly absorbing and releasing lithium. The crystalline structure can be confirmed by X-ray diffraction (XRD) measurement, for example.

It is preferred that x in $Li_4Ti_{5-x}Mn_xO_{12}$ satisfies $0<x\leq0.3$. An in-depth study by the present inventors has revealed that a lithium titanium complex oxide exerts a desirable electronic conductivity if only a very small portion of Ti element is substituted with Mn. Therefore, x only needs to be greater than 0. When x increases, the available discharge capacity of a lithium ion secondary battery using a negative electrode active material of the present embodiment tends to decrease, and it has been shown that the available discharge capacity decreases significantly when x exceeds 0.3. As will be discussed in the Examples section below, it is more preferred that the amount x of Mn element added satisfies $0<x\leq0.1$ in view of the electrode capacity density.

The lithium titanium complex oxide having a composition expressed as $Li_4Ti_{5-x}Mn_xO_{12}$ (where $0<x\leq0.3$) may be in the form of primary particles or secondary particles, each being an aggregation of primary particles. In either case, there is no particular limitation on the average particle size d (μm) of primary particles, which may be 0.1 μm or more and 1 mm or less, for example. As used herein, the average particle size d is obtained by taking an image of a lithium titanium complex oxide with scanning electron microscope (SEM), arbitrarily selecting 30 particles from the SEM image, measuring the primary particle sizes, and calculating the average thereof. A lithium titanium complex oxide of the present embodiment expressed by the composition formula above is more easily produced as one that has a relatively small average particle size d. In view of the ease of production, the average particle size d is preferably 0.5 μm or more and 1.5 μm or less.

The lithium titanium complex oxide contained in the negative electrode active material for a lithium ion secondary battery of the present embodiment can be synthesized by mixing and calcining a compound containing the constituent elements. Specifically, for example, the production can be done through a step of weighing the Li source, titanium oxide and the Mn source to such a proportion that Li, Ti and Mn will be in a ratio indicated by the composition formula and uniformly mixing the weighed materials together, and a step of calcining the mixture.

The Li source may be LiOH or a hydrate thereof, $Li_2CO_3$, $Li_2SO_4$, LiF, $Li_2O$, or the like. While the LiOH hydrate is typically a monohydrate ($LiOH.H_2O$), LiOH hydrates of other levels of water content may by used. In view of the reaction temperature and the possibility of impurity residue, it is preferred to use LiOH or a hydrate thereof or $Li_2CO_3$. The titanium oxide may be one that has the rutile or anatase crystalline structure. In view of the reactivity, it is preferred to use one that has the anatase crystalline structure. The Mn source may be MnO, $Mn_3O_4$, $MnO_2$, $Mn(OH)_2$, $MnCO_3$, $MnSO_4$, or the like. In view of the reaction temperature, it is preferred to use $MnO_2$ or $MnCO_3$.

The calcining may be done in an air atmosphere, an oxygen atmosphere, or an inert gas atmosphere such as nitrogen or argon. The calcining temperature depends on the Li source, the titanium oxide and the Mn source used. Where the respective preferred materials described above are used for the Li source, the titanium oxide and the Mn source, it is possible to obtain a lithium titanium complex oxide having a composition expressed as $Li_4Ti_{5-x}Mn_xO_{12}$ (where $0<x\leq0.3$) by calcining the mixture at a temperature of about 700° C. or more and about 1000° C. or less.

With a negative electrode active material for a lithium ion secondary battery of the present embodiment, the lithium titanium complex oxide has a better electronic conductivity than that of $Li_4Ti_5O_{12}$. Therefore, when used as a negative electrode active material for a lithium ion secondary battery, it is possible to realize a lithium ion secondary battery with desirable high output characteristics.

Second Embodiment

A negative electrode active material for a lithium ion secondary battery according to a second embodiment of the present invention will be described. The negative electrode active material for a lithium ion secondary battery of the present embodiment contains a lithium titanium complex oxide having a composition expressed as $Li_4Ti_{5-x-y}Mn_xV_yO_{12}$ (where $0<x\leq0.3$, $0<y\leq0.05$). The lithium titanium complex oxide of the present embodiment is a compound obtained by further substituting a portion of Ti element of the lithium titanium complex oxide of the first embodiment with V element. Herein, x and y represent the amounts of substitution of Mn element and V element, respectively.

V element provides an effect of increasing the particle size of the lithium titanium complex oxide. Conventional lithium titanium complex oxide materials typically have primary particle sizes of 1 μm or less. Therefore, it was not possible to realize a large packing density when the electrode is formed by using such a lithium titanium complex oxide material.

In contrast, the present inventors have found that substituting a portion of Ti element with V element increases the primary particle size, thereby improving the packing property as an electrode of a lithium ion secondary battery. Thus, by further substituting Ti element with V element in a lithium titanium complex oxide having a composition expressed as $Li_4Ti_{5-x}Mn_xO_{12}$ (where $0<x\leq0.3$), which is the lithium titanium complex oxide of the first embodiment, it is possible to realize a lithium titanium complex oxide with a high electronic conductivity and a large primary particle size. Therefore, when the lithium titanium complex oxide of the present embodiment is used as a negative electrode active material for a lithium ion secondary battery, it is possible to realize a lithium ion secondary battery having desirable high output characteristics with a high capacity.

As in the first embodiment, the lithium titanium complex oxide of the present embodiment has a spinel crystalline structure. The crystalline structure can be confirmed by X-ray diffraction (XRD).

The amount x of Mn element added preferably satisfies $0<x\leq0.3$ in the lithium titanium complex oxide of the present embodiment. More preferably, the amount x of Mn element added satisfies $0<x\leq0.1$. This is based on a reason similar to that of the first embodiment.

The amount y of V element added is preferably $0<y\leq0.05$. With a portion of Ti substituted with V element, it is possible to obtain the effect of increasing the primary particle size. The reason why the primary particle size increases is not clear. It is nevertheless believed that since the melting point of $V_2O_5$, which is the V source, is relatively low at 690° C., and $V_2O_5$ is therefore in a molten state during calcining, the diffusion of the V source is very fast, thereby facilitating the growth of particles of the lithium titanium complex oxide. On the other hand, if the amount of V element added exceeds 0.05, there occurs an oxide phase containing no Ti element, and it is then difficult to obtain a single phase of a lithium titanium complex oxide of the spinel crystalline structure. This can be confirmed by X-ray diffraction (XRD) measurement.

A lithium ion secondary battery using a negative electrode active material of the present embodiment with large amounts x and y of substitution of Mn element and V element shows a decrease in the available discharge capacity. That is, the available discharge capacity decreases in accordance with the amounts of substitution of Mn element and V element. However, when a lithium titanium complex oxide of the present embodiment is used as a negative electrode active material for a lithium ion secondary battery, the packing density in the electrode is increased, thereby improving the capacity density as an electrode, due to the effect of increasing the primary particle size, within the aforementioned range for the amounts x and y of substitution.

The lithium titanium complex oxide of the present embodiment may be in the form of primary particles or secondary particles, each being an aggregation of primary particles. In either case, it is preferred that the average particle size d (μm) of the primary particles is $1\leq d\leq 5$.

The average particle size of primary particles tends to increase as the amount of substitution of V element increases. Depending on the application, the average particle size d of the lithium titanium complex oxide may be 5 μm or more.

As in the first embodiment, the lithium titanium complex oxide contained in the negative electrode active material for a lithium ion secondary battery of the present embodiment can also be synthesized by mixing and calcining a compound containing the constituent elements. Specifically, for example, the production can be done through a step of weighing the Li source, the titanium oxide, the Mn source and the V source to such a proportion that Li, Ti, Mn and V will be in a ratio indicated by the composition formula and uniformly mixing the weighed materials together, and a step of calcining the mixture. As used herein, "uniformly" means that there is no significant unevenness in the distribution on the level of particles of the material.

The Li source may be LiOH or a hydrate thereof, $Li_2CO_3$, $Li_2SO_4$, LiF, $Li_2O$, or the like. While the LiOH hydrate is typically a monohydrate ($LiOH.H_2O$), LiOH hydrates of other levels of water content may by used. In view of the reaction temperature and the possibility of impurity residue, it is preferred to use LiOH or a hydrate thereof or $Li_2CO_3$. The titanium oxide may be one that has the rutile or anatase crystalline structure. In view of the reactivity, it is preferred to use one that has the anatase crystalline structure. The Mn source may be MnO, $Mn_3O_4$, $MnO_2$, $Mn(OH)_2$, $MnCO_3$, $MnSO_4$, or the like. In view of the reaction temperature, it is preferred to use $MnO_2$ or $MnCO_3$. It is preferred to use $V_2O_5$ as the V source.

The calcining may be done in an air atmosphere, an oxygen atmosphere, or an inert gas atmosphere such as nitrogen or argon. The calcining temperature depends on the Li source, the titanium oxide, the Mn source and the V source used. Where the respective preferred materials described above are used for the Li source, the titanium oxide, the Mn source and the V source, it is possible to obtain a lithium titanium complex oxide having a composition expressed as $Li_4Ti_{5-x-y}Mn_xV_yO_{12}$ (where $0<x\leq0.3$, $0<y\leq0.05$) by calcining the mixture at a temperature of about 700° C. or more and about 1000° C. or less.

With a negative electrode active material for a lithium ion secondary battery of the present embodiment, the lithium titanium complex oxide has a better electronic conductivity than that of $Li_4Ti_5O_{12}$. Therefore, when used as a negative electrode active material for a lithium ion secondary battery, it is possible to realize a lithium ion secondary battery with desirable high output characteristics. Moreover, since the packing density of the negative electrode active material at the negative electrode can be increased, it is possible to realize a lithium ion secondary battery with a high capacity.

Third Embodiment

A negative electrode active material for a lithium ion secondary battery according to a third embodiment of the present invention will be described. The negative electrode active material for a lithium ion secondary battery of the present embodiment contains a lithium titanium complex oxide having a composition expressed as $Li_4Ti_{5-x-y}Mn_xB_zO_{12}$ (where $0<x\leq0.3$, $0<z\leq0.3$). The lithium titanium complex oxide of the present embodiment is a compound in which a portion of Ti element of the lithium titanium complex oxide of the first embodiment is further substituted with B element. In the composition, x and z represent the amounts of substitution of Mn element and B element, respectively.

B element, like V element, has the effect of increasing the particle size of the lithium titanium complex oxide. The present inventors have found that substituting a portion of Ti element with B element, as with V element, increases the primary particle size of the lithium titanium complex oxide, thereby improving the packing property as an electrode of a lithium ion secondary battery. By further substituting Ti element with B element in a lithium titanium complex oxide having a composition expressed as $Li_4Ti_{5-x}Mn_xO_{12}$ (where $0<x\leq0.3$), which is the lithium titanium complex oxide of the first embodiment, it is possible to realize a lithium titanium complex oxide with a high electronic conductivity and a large primary particle size. Therefore, when the lithium titanium complex oxide of the present embodiment is used as a negative electrode active material for a lithium ion secondary battery, it is possible to realize a lithium ion secondary battery having desirable high output characteristics with a high capacity.

As in the first embodiment, the lithium titanium complex oxide of the present embodiment has a spinel crystalline structure. The crystalline structure can be confirmed by X-ray diffraction (XRD).

The amount of Mn element added is preferably $0<x\leq0.3$ in the lithium titanium complex oxide of the present embodiment. This is based on a reason similar to that of the first embodiment.

The amount z of B element added is preferably $0<z\leq0.3$. With a portion of Ti substituted with B element, it is possible to obtain the effect of increasing the primary particle size. The reason why the primary particle size increases is not clear. It is nevertheless believed that since the melting point of $B_2O_3$, which is the B source, is relatively low at 480° C., and $B_2O_3$ is therefore in a molten state during calcining, the diffusion of the B source is very fast, thereby facilitating the growth of particles of the lithium titanium complex oxide. It is believed that also when $HBO_3$ is used as the B source, the growth of particles of the lithium titanium complex oxide is facilitated similarly because $HBO_3$ decomposes into $B_2O_3$ at around 169° C.

On the other hand, if the amount of B element added exceeds 0.3, there occurs an oxide phase containing no Ti element, and it is then difficult to obtain a single phase of a lithium titanium complex oxide of the spinel crystalline structure. This can be confirmed by X-ray diffraction (XRD) measurement.

A lithium ion secondary battery using a negative electrode active material of the present embodiment with large amounts x and z of substitution of Mn element and B element shows a decrease in the available discharge capacity. That is, the available discharge capacity decreases in accordance with the amounts of substitution of Mn element and B element. However, when a lithium titanium complex oxide of the present embodiment is used as a negative electrode active material for a lithium ion secondary battery, the packing density in the electrode is increased, thereby improving the capacity density as an electrode, due to the effect of increasing the primary particle size, within the aforementioned range for the amounts x and z of substitution.

The lithium titanium complex oxide of the present embodiment may be in the form of primary particles or secondary particles, each being an aggregation of primary particles. In either case, it is preferred that the average particle size d (µm) of the primary particles is $1\leq d\leq11$. The average particle size of primary particles tends to increase as the amount of substitution of V element increases. Depending on the application, the average particle size d of the lithium titanium complex oxide may be 11 µm or more.

As in the first embodiment, the lithium titanium complex oxide contained in the negative electrode active material for a lithium ion secondary battery of the present embodiment can also be synthesized by mixing and calcining a compound containing the constituent elements. Specifically, for example, the production can be done through a step of weighing the Li source, the titanium oxide, the Mn source and the B source to such a proportion that Li, Ti, Mn and B will be in a ratio indicated by the composition formula and uniformly mixing the weighed materials together, and a step of calcining the mixture.

The Li source may be LiOH or a hydrate thereof, $Li_2CO_3$, $Li_2SO_4$, LiF, $Li_2O$, or the like. While the LiOH hydrate is typically a monohydrate ($LiOH.H_2O$), LiOH hydrates of other levels of water content may by used. In view of the reaction temperature and the possibility of impurity residue, it is preferred to use LiOH or a hydrate thereof or $Li_2CO_3$. The titanium oxide may be one that has the rutile or anatase crystalline structure. In view of the reactivity, it is preferred to use one that has the anatase crystalline structure. The Mn source may be MnO, $Mn_3O_4$, $MnO_2$, $Mn(OH)_2$, $MnCO_3$, $MnSO_4$, or the like. In view of the reaction temperature, it is preferred to use $MnO_2$ or $MnCO_3$. It is preferred to use $H_3BO_3$ or $B_2O_3$ the B source.

The calcining may be done in an air atmosphere, an oxygen atmosphere, or an inert gas atmosphere such as nitrogen or argon. The calcining temperature depends on the Li source, the titanium oxide, the Mn source and the B source used. Where the respective preferred materials described above are used for the Li source, the titanium oxide, the Mn source and the B source, it is possible to obtain a lithium titanium complex oxide having a composition expressed as $Li_4Ti_{5-x-z}Mn_xB_zO_{42}$ (where $0<x\leq0.3$, $0<z\leq0.3$) by calcining the mixture at a temperature of about 700° C. or more and about 1000° C. or less.

With a negative electrode active material for a lithium ion secondary battery of the present embodiment, the lithium titanium complex oxide has a better electronic conductivity than that of $Li_4Ti_5O_{12}$. Therefore, when used as a negative electrode active material for a lithium ion secondary battery, it is possible to realize a lithium ion secondary battery is realized with desirable high output characteristics. Moreover, since the packing density of the negative electrode active material at the negative electrode can be increased, it is possible to realize a lithium ion secondary battery with a high capacity.

EXAMPLES

Hereinafter, results of synthesizing negative electrode active materials for lithium ion secondary batteries, which are examples of the present invention, and examining various properties thereof, will be described.

1. Synthesis

Example 1

The material powders of $LiOH.H_2O$, $TiO_2$ and $MnO_2$ were weighed so that the molar ratio Li/Ti/Mn is 4/(5−x)/x (x=0.01), and mixed together in a mortar. The material $TiO_2$ used was one having an anatase crystalline structure and an average particle size of about 0.3 µm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 2

The material powders of LiOH.H$_2$O, TiO$_2$ and MnO$_2$ were weighed so that the molar ratio Li/Ti/Mn is 4/(5−x)/x (x=0.05), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 3

The material powders of LiOH.H$_2$O, TiO$_2$ and MnO$_2$ were weighed so that the molar ratio Li/Ti/Mn is 4/(5−x)/x (x=0.1), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 4

The material powders of LiOH.H$_2$O, TiO$_2$ and MnO$_2$ were weighed so that the molar ratio Li/Ti/Mn is 4/(5−x)/x (x=0.3), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 5

The material powders of LiOH.H$_2$O, TiO$_2$, MnO$_2$ and V$_2$O$_5$ were weighed so that the molar ratio Li/Ti/Mn/V is 4/(5−x−y)/x/y (x=0.01, y=0.05), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 6

The material powders of LiOH.H$_2$O, TiO$_2$, MnO$_2$ and V$_2$O$_5$ were weighed so that the molar ratio Li/Ti/Mn/V is 4/(5−x−y)/x/y (x=0.05, y=0.05), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 7

The material powders of LiOH.H$_2$O, TiO$_2$, MnO$_2$ and V$_2$O$_5$ were weighed so that the molar ratio Li/Ti/Mn/V is 4/(5−x−y)/x/y (x=0.3, y=0.05), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 8

The material powders of LiOH.H$_2$O, TiO$_2$, MnO$_2$ and HBO$_3$ were weighed so that the molar ratio Li/Ti/Mn/B is 4/(5−x−z)/x/z (x=0.01, z=0.3), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 9

The material powders of LiOH.H$_2$O, TiO$_2$, MnO$_2$ and HBO$_3$ were weighed so that the molar ratio Li/Ti/Mn/B is 4/(5−x−z)/x/z (x=0.05, z=0.05), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 10

The material powders of LiOH.H$_2$O, TiO$_2$, MnO$_2$ and HBO$_3$ were weighed so that the molar ratio Li/Ti/Mn/B is 4/(5-x-z)/x/z (x=0.3, z=0.3), and mixed together in a mortar. The material TiO$_2$ used was one having an anatase crystalline structure and an average particle size of about 0.3 μm.

The mixture of the material powders was put in an Al$_2$O$_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Example 11

The material powders of $LiOH \cdot H_2O$, $TiO_2$ and $MnCO_3$ were weighed so that the molar ratio Li/Ti/Mn is $4/(5-x)/x$ (x=0.3), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 1

The material powders of $LiOH \cdot H_2O$ and $TiO_2$ were weighed so that the molar ratio Li/Ti is 4/5, and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 2

The material powders of $LiOH \cdot H_2O$, $TiO_2$ and $VO_5$ were weighed so that the molar ratio Li/Ti/V is $4/(5-y)/y$ (y=0.01), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 3

The material powders of $LiOH \cdot H_2O$, $TiO_2$ and $VO_5$ were weighed so that the molar ratio Li/Ti/V is $4/(5-y)/y$ (y=0.05), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 4

The material powders of $LiOH \cdot H_2O$, $TiO_2$ and $VO_5$ were weighed so that the molar ratio Li/Ti/V is $4/(5-y)/y$ (y=0.1), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 5

The material powders of $LiOH \cdot H_2O$, $TiO_2$ and $HBO_3$ were weighed so that the molar ratio Li/Ti/B is $4/(5-z)/z$ (z=0.01), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 6

The material powders of $LiOH \cdot H_2O$, $TiO_2$ and $HBO_3$ were weighed so that the molar ratio Li/Ti/B is $4/(5-z)/z$ (z=0.05), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 7

The material powders of $LiOH \cdot H_2O$, $TiO_2$ and $HBO_3$ were weighed so that the molar ratio Li/Ti/B is $4/(5-z)/z$ (z=0.1), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 8

The material powders of $LiOH \cdot H_2O$, $TiO_2$ and $HBO_3$ were weighed so that the molar ratio Li/Ti/B is $4/(5-z)/z$ (z=0.3), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

Reference Example 9

The material powders of $LiOH \cdot H_2O$, $TiO_2$ and $HBO_3$ were weighed so that the molar ratio Li/Ti/B is $4/(5-z)/z$ ($z=0.75$), and mixed together in a mortar. The material $TiO_2$ used was one having an anatase crystalline structure and an average particle size of about 0.3 μm.

The mixture of the material powders was put in an $Al_2O_3$ crucible and calcined in an electric furnace in an air atmosphere. The calcining temperature was 850° C., and the calcining temperature holding time was 12 hours.

The calcined material was taken out of the crucible and crushed in a mortar to obtain an intended lithium titanium complex oxide.

2. Confirmation of Crystalline Structure

Powder X-ray diffraction (XRD) measurements were done in order to confirm the crystalline structure of the lithium titanium complex oxides of Examples 1-11 and Reference Examples 1-9. An XRD measurement apparatus from Rigaku Corporation was used for the measurements.

FIG. 1 shows the profiles of the XRD measurements. Table 1 shows the amounts x, y and z of Mn, V and B added for all examples of the present invention and reference examples.

TABLE 1

|  | Amount of Mn added (x) | Amount of V added (y) | Amount of B added (z) |
|---|---|---|---|
| Example 1 | 0.01 | 0 | 0 |
| Example 2 | 0.05 | 0 | 0 |
| Example 3 | 0.1 | 0 | 0 |
| Example 4 | 0.3 | 0 | 0 |
| Example 5 | 0.01 | 0.05 | 0 |
| Example 6 | 0.05 | 0.05 | 0 |
| Example 7 | 0.3 | 0.05 | 0 |
| Example 8 | 0.01 | 0 | 0.3 |
| Example 9 | 0.05 | 0 | 0.05 |
| Example 10 | 0.3 | 0 | 0.3 |
| Example 11 | 0.3 | 0 | 0 |
| Reference Example 1 | 0 | 0 | 0 |
| Reference Example 2 | 0 | 0.01 | 0 |
| Reference Example 3 | 0 | 0.05 | 0 |
| Reference Example 4 | 0 | 0.1 | 0 |
| Reference Example 5 | 0 | 0 | 0.01 |
| Reference Example 6 | 0 | 0 | 0.05 |
| Reference Example 7 | 0 | 0 | 0.1 |
| Reference Example 8 | 0 | 0 | 0.3 |
| Reference Example 9 | 0 | 0 | 0.75 |

These results confirmed that the lithium titanium complex oxides of Examples 1-11, Reference Examples 1-3 and 5-8 had a single spinel phase. The lithium titanium complex oxide of Reference Example 4 contains a small amount of an $Li_3VO_4$ phase, in addition to the spinel phase. The lithium titanium complex oxide of Reference Example 9 contains a small amount of an $Li_2B_4O_7$ phase, in addition to the spinel phase.

These results showed that it is possible to obtain a lithium titanium complex oxide including a single spinel phase if the composition of the lithium titanium complex oxide is in the ranges of Examples 1-11 and Reference Examples 1-3 and 5-8, i.e., $0<x\leq0.3$, $0<y\leq0.05$, $0<z\leq0.3$. It was also shown that it is not possible to obtain a single spinel phase when the amount y of V added is excessive as in Reference Example 4 or when the amount z of B added is excessive as in Reference Example 9.

With the measurement results of Example 4 and Example 11 being substantially equal to each other, it was shown that the same lithium titanium complex oxide is obtained whether $MnO_2$ or $MnCO_3$ is used as the Mn source.

3. Confirmation of Average Particle Size

In the examples of the present invention, the average particle size of the primary particles was evaluated in terms of the "average particle size d" as defined below. We arbitrarily selected 30 particles from a SEM image to measure the primary particle sizes, and calculated the average thereof, thus estimating the "average particle size d".

Typically, the "cumulative average particle size $d_{50}$" in particle size distribution measurement is often used as the average particle size. However, the particle size distribution measurement is a measurement of the size of aggregated particles (secondary particles), as opposed to the size of primary particles. There is no correlation between the size of primary particles and the size of secondary particles. Therefore, the "average particle size d", which is a unit representing the size of primary particles, is suitable for demonstrating the effects from the examples of the present invention.

A scanning electron microscope (SEM) was used to examine the "average particle size d" for the lithium titanium complex oxides of Examples 1-10 and Reference Examples 1-3 and 5-8, which had a single spinel phase. An apparatus from Hitachi High-Technologies Corporation was used.

Figure 2A:
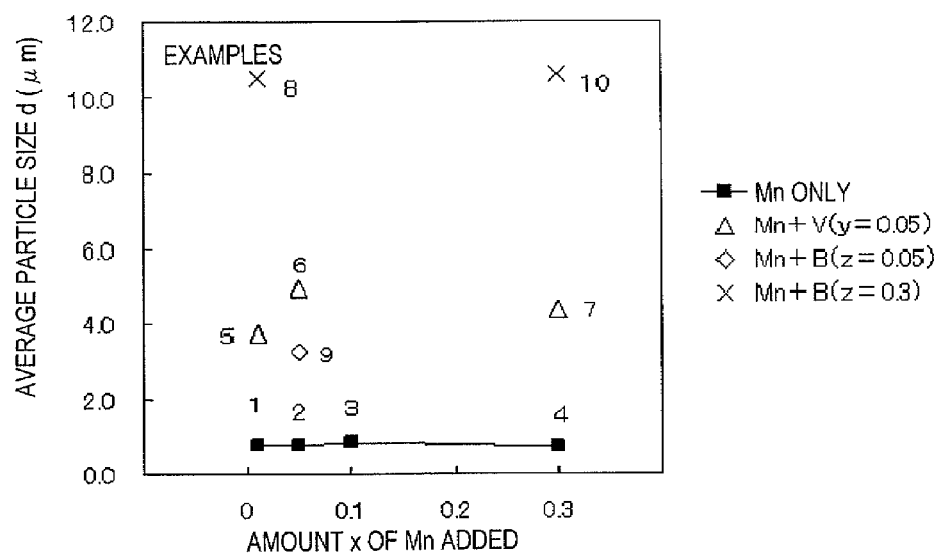
FIG. 2A is a graph showing the relationship between the average particle size and the amount of Mn added for lithium titanium complex oxides of Examples 1-10.
Figure 2B:
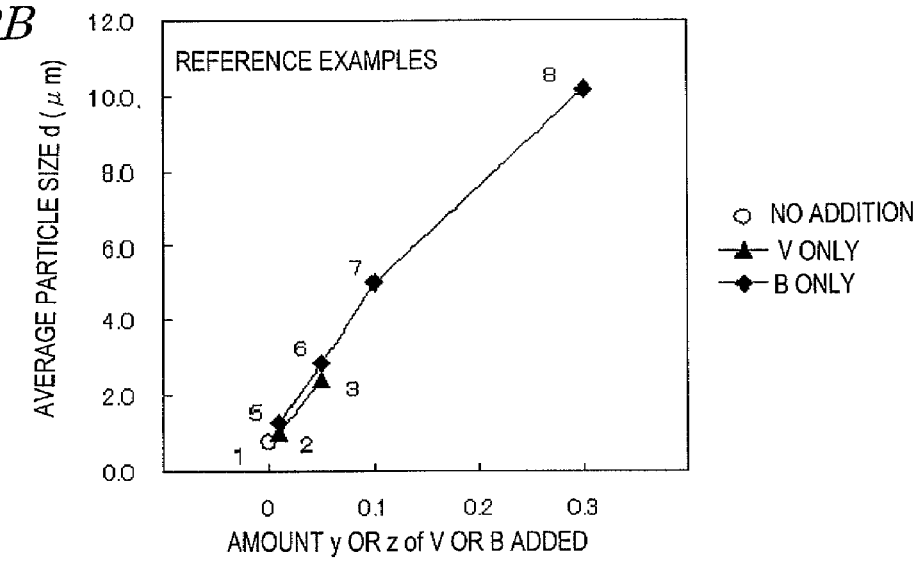
FIG. 2B is a graph showing the relationship between the average particle size and the amount of B or V added for lithium titanium complex oxides of Reference Examples 1-3 and 5-8.

Table 2 shows the average particle size d for the lithium titanium complex oxides of Examples 1-10 and Reference Examples 1-3 and 5-8, calculated from SEM images. FIG. 2A shows the relationship between the average particle size d and the amount of Mn added for the lithium titanium complex oxides of Examples 1-10, and FIG. 2B shows the relationship between the average particle size d and the amount of V or B added for the lithium titanium complex oxides of Reference Examples 1-3 and 5-8.

TABLE 2

|  | Average particle size d μm | Pressed density g/cm³ | Discharge reversible capacity mAh/g | 1 C rate characteristics % vs 0.02 C | Electrode capacity density ρ mAh/cm³ |
|---|---|---|---|---|---|
| Example 1 | 0.74 | 2.14 | 163 | 91.1 | 348 |
| Example 2 | 0.74 | 2.13 | 161 | 88.8 | 341 |
| Example 3 | 0.83 | 2.24 | 154 | 89.0 | 346 |
| Example 4 | 0.71 | 2.12 | 133 | 90.9 | 281 |
| Example 5 | 3.75 | 2.68 | 156 | 92.3 | 419 |
| Example 6 | 4.93 | 2.80 | 149 | 90.8 | 417 |
| Example 7 | 4.36 | 2.62 | 121 | 92.8 | 316 |
| Example 8 | 10.49 | 2.66 | 133 | 93.2 | 354 |
| Example 9 | 3.24 | 2.62 | 153 | 91.6 | 400 |
| Example 10 | 10.56 | 2.69 | 108 | 89.6 | 291 |
| Reference Example 1 | 0.77 | 2.09 | 165 | 68.8 | 339 |
| Reference Example 2 | 1.01 | 2.36 | 164 | 68.6 | 387 |
| Reference Example 3 | 2.47 | 2.57 | 150 | 67.0 | 387 |

TABLE 2-continued

| | Average particle size d μm | Pressed density g/cm³ | Discharge reversible capacity mAh/g | 1 C rate characteristics % vs 0.02 C | Electrode capacity density ρ mAh/cm³ |
|---|---|---|---|---|---|
| Reference Example 5 | 1.30 | 2.28 | 164 | 68.5 | 373 |
| Reference Example 6 | 2.84 | 2.40 | 156 | 63.2 | 375 |
| Reference Example 7 | 4.99 | 2.68 | 155 | 61.2 | 414 |
| Reference Example 8 | 10.16 | 2.72 | 140 | 58.6 | 380 |

The average particle size d of the lithium titanium complex oxides of Examples 1-4 and Reference Example 1 is about 0.8 μm, whereas the average particle size d of the lithium titanium complex oxides of Examples 5-10 and Reference Examples 2-3 and 5-8 is larger and about 1 μm to about 10 μm. These results showed that substituting Ti element only with Mn element provides no significant change to the primary particle size, whereas substituting Ti element with B element or V element provides the effect of increasing the primary particle size.

4. Measurement of Pressed Density

For the lithium titanium complex oxides of Examples 1-10 and Reference Examples 1-3 and 5-8, the pressed density was measured as a measure of the packing property when made into an electrode. A powder resistance measurement system from Mitsubishi Chemical Analytech Co., Ltd. was used for the measurement. The density under an applied pressure of 64 MPa was determined as the pressed density.

Figure 3A:
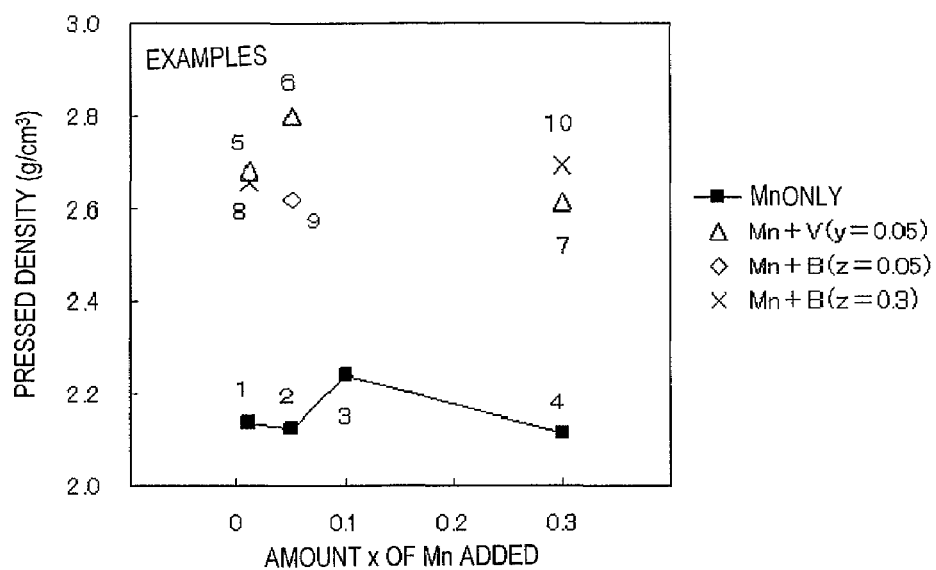
FIG. 3A is a graph showing the relationship between the pressed density and the amount of Mn added for lithium titanium complex oxides of Examples 1-10.
Figure 3B:
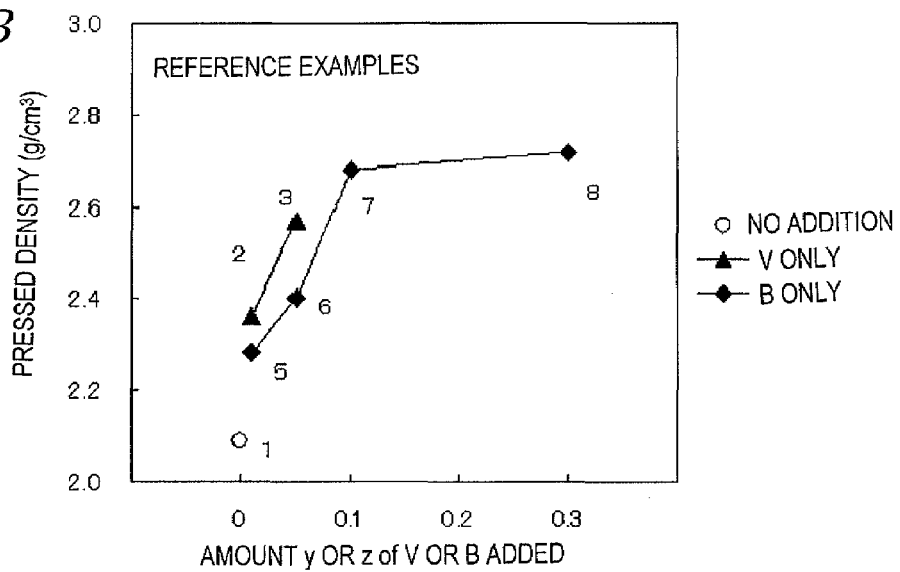
FIG. 3B is a graph showing the relationship between the pressed density and the amount of B or V added for lithium titanium complex oxides of Reference Examples 1-3 and 5-8.

Table 2 shows the measurement results. FIG. 3A shows the relationship between the pressed density measurement results and the amount of Mn added for Examples 1-10. FIG. 3B shows the relationship between the pressed density measurement results and the amount of V or B added for Reference Examples 1-3 and 5-8.

As compared with the pressed densities of Examples 1-4 and Reference Example 1 from about 2.1 g/cm³ to about 2.2 g/cm³, those of Examples 5-10 were larger and from about 2.6 g/cm³ to 2.8 g/cm³, and those of Reference Examples 2, 3 and 5-8 were larger and from about 2.3 g/cm³ to about 2.7 g/cm³.

The results of the average particle size and the pressed density showed the tendency that larger average particle sizes lead to larger pressed densities.

5. Production of Electrode

Electrodes were produced using the lithium titanium complex oxides of Examples 1-10 and Reference Examples 1-3 and 5-8 as the active material. The active material, a conductive material and a binder were weighed to a weight ratio of 85/10/5, and mixed together in a mortar. Acetylene black and PTFE were used as the conductive material and the binder, respectively. After mixing, the mixture was rolled out with a roller and punched into pellet-shaped electrodes.

6. Production of Battery

Batteries were produced using these electrodes in order to examine properties as a negative electrode active material for a lithium ion secondary battery. Typically, in a lithium ion secondary battery, a lithium transition metal complex oxide (typically containing a transition metal such as Co, Mn or Ni) such as $LiCoO_2$ is used as the positive electrode active material. In the examples of the present invention, however, a metal Li was used, instead of a common positive electrode active material, in the counter electrode, in order to examine the properties of the negative electrode active material per se, independent of the positive electrode active material. Methods like this are common in evaluating active materials.

Coin batteries were produced. Each of the electrodes produced in accordance with the examples and the reference examples was stacked with a separator impregnated with electrolyte and a metal Li plate in this order, and sealed in a coin-shaped case, obtaining a battery. The separator includes a PE microporous membrane from Asahi Kasei E-materials Corporation and a PP non-woven fabric from Tapyrus Co., Ltd., layered together in the order PP/PE/PP. The electrolyte included 1 mol/L of $LiPF_6$ dissolved in a solvent mixed so that EC/EMC=1/3.

Batteries produced using the lithium titanium complex oxides of Examples 1-10 and Reference Examples 1-3 and 5-8 as active materials will be referred to as batteries containing the active materials of Examples 1-10 and Reference Examples 1-3 and 5-8, respectively.

7. Evaluation of Available Discharge Capacity

Each produced battery was charged and then discharged so as to examine the available discharge capacity thereof. A charge-discharge system from Nagano Co., Ltd. was used for the charge-discharge test. The charge-discharge test was performed so that the voltage range was from 1 V to 3 V and the current rate was 0.02 C rate. Herein, 1 C rate is defined as a current value representing the discharge rate over 1 hour, and 0.02 C rate is the current value that is 0.02 time 1 C rate, i.e., a current value representing the discharge rate over 50 hours.

Figure 4A:
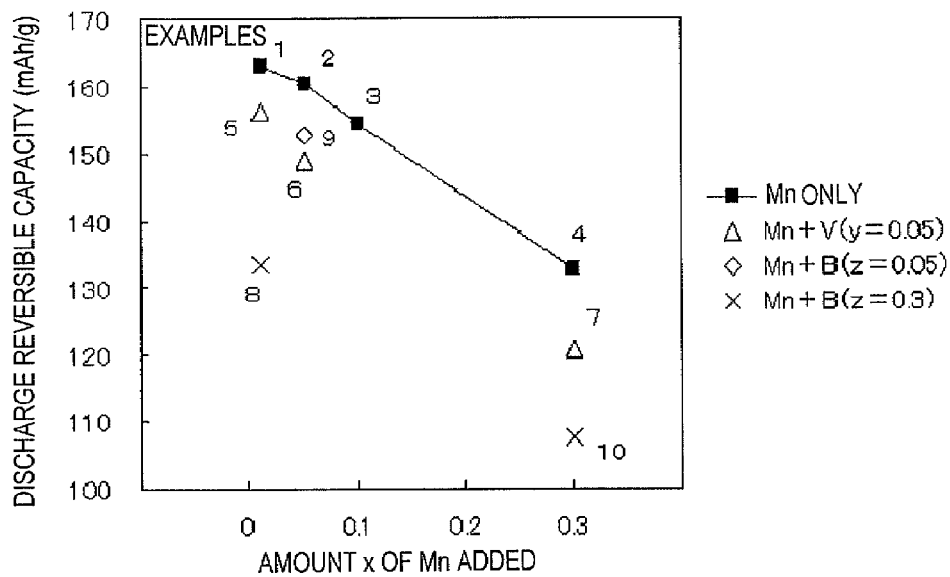
FIG. 4A is a graph showing the relationship between the discharge reversible capacity and the amount of Mn added for batteries containing active materials of Examples 1-10.
Figure 4B:
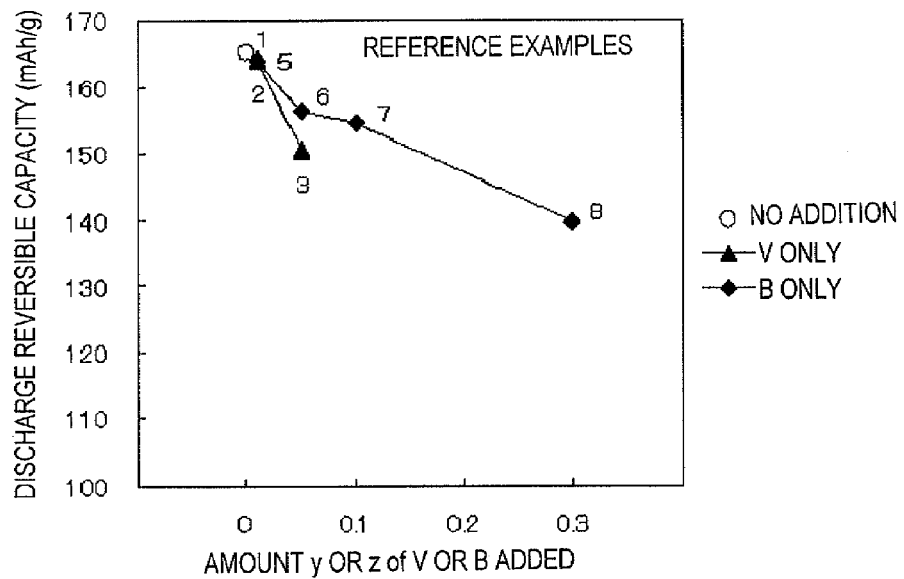
FIG. 4B is a graph showing the relationship between the discharge reversible capacity and the amount of B or V added for batteries of Reference Examples 1-3 and 5-8.

Table 2 shows the available discharge capacity measurement results. FIG. 4A shows the relationship between the measurement results and the amount of Mn added for Examples 1-10. FIG. 4B shows the relationship between the measurement results and the amount of V or B added for Reference Examples 1-3 and 5-8.

As can be seen from Table 2, the available discharge capacity is highest for Reference Example 1. From the measurement results for batteries containing the active materials of Examples 1-4 and Reference Example 1, it can be seen that the available discharge capacity decreases as the amount x by which Ti element is substituted with Mn element increases. From the results for batteries of Reference Examples 1-3 and 5-8, it can be seen that the available discharge capacity decreases as the amount y or z by which Ti element is substituted with V element or B element increases. Moreover, the measurement results for batteries containing the active materials of Examples 5-10 showed that for those in which Ti element was further substituted with V element or B element in addition to substitution with Mn element, the available discharge capacity was further decreased by the V or B substitution in addition to a decrease by the Mn substitution.

8. Evaluation of Rate Characteristics

A rate characteristics evaluation was performed using the batteries produced in order to examine the output characteristics thereof. A charge-discharge system from Nagano Co., Ltd. was used, and the charge-discharge test was performed so that the voltage range was from 1 V to 3 V. After the battery was charged with a constant current at 1 C rate, it was charged with a constant voltage at 3 V until the current value reached 0.02 C rate. Measurements were performed while setting the current rate during discharge after charging to 0.02 C and to 1 C. The available discharge capacity at 1 C rate was compared with the available discharge capacity at 0.02 C rate.

Figure 5A:
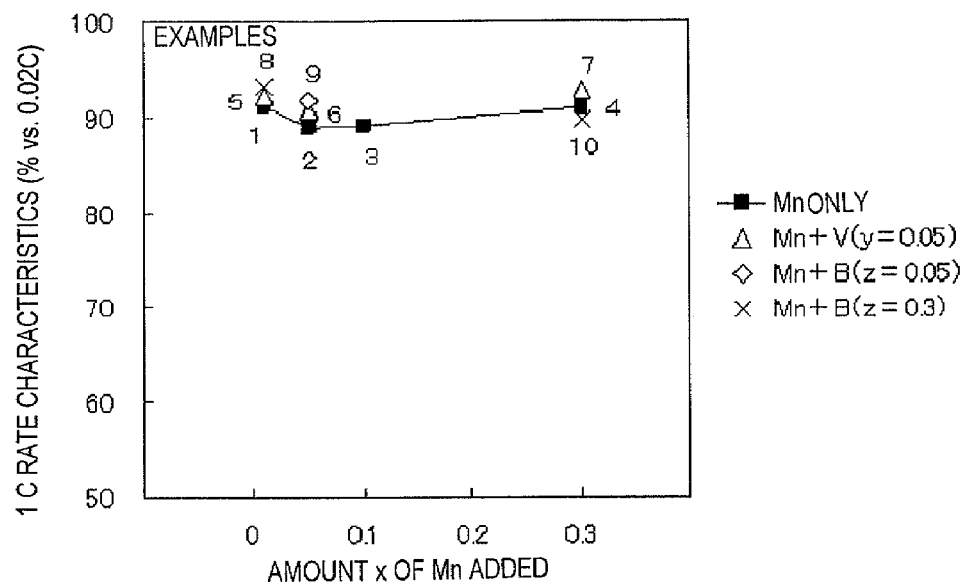
FIG. 5A is a graph showing the relationship between the rate characteristics and the amount of Mn added for batteries containing active materials of Examples 1-10.
Figure 5B:
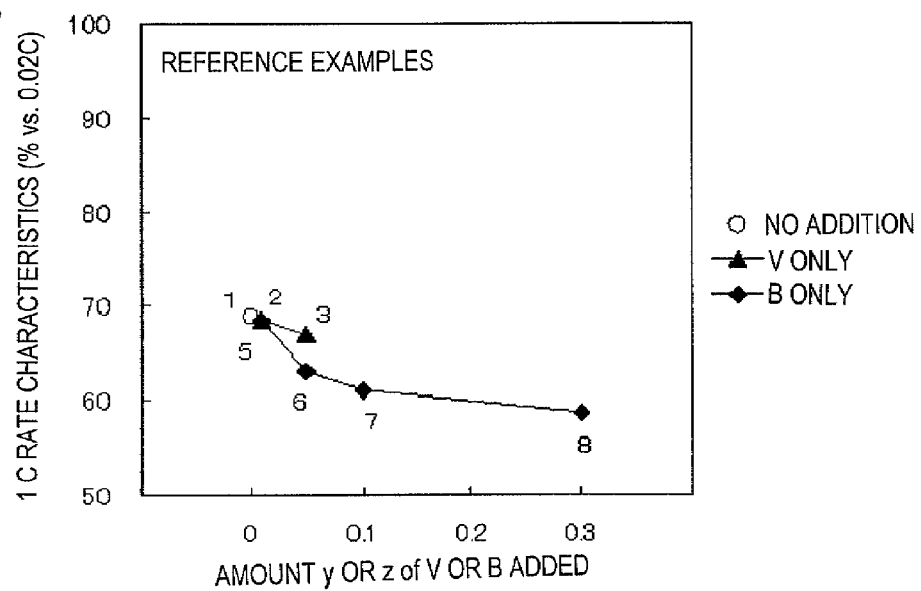
FIG. 5B is a graph showing the relationship between the rate characteristics and the amount of B or V added for batteries of Reference Examples 1-3 and 5-8.

Table 2 shows the rate characteristics measurement results. FIG. 5A shows the relationship between the measurement results and the amount of Mn added for Examples 1-10. FIG. 5B shows the relationship between the measurement results and the amount of V or B added for Reference Examples 1-3 and 5-8.

From the measurement results for batteries containing the active materials of Examples 1-10 and Reference Example 1, it can be seen that the rate characteristics improve significantly by substituting a portion of Ti element with Mn element. As can be seen from the measurement results for batteries containing the active materials of Reference Examples 2-3 and 5-9, the rate characteristics deteriorate when a portion of Ti element is substituted only with V element or B element. It is believed that since substitution with V element or B element rapidly increases the particle size while it does not significantly improve the electronic conductivity, Li ion diffusion within particles takes a longer time, thereby deteriorating the rate characteristics at high loads.

In contrast, when a portion of Ti element is substituted with Mn element, the lithium titanium complex oxide has a sufficiently high electronic conductivity. It is believed that even if the particle size of the lithium titanium complex oxide increases due to further substitution of a portion of Ti element with B element or V element, Li ion diffusion within particles is sufficiently fast, thus improving the rate characteristics.

9. Evaluation of Electrode Capacity Density

The capacity density per volume of an electrode directly contributes to the energy density of the battery, and an improvement thereof has been sought for. The electrode capacity density is expressed as the product between the density of the active material in the electrode, the weight capacity density of the active material, and the discharge average voltage. The pressed density of the active material can be used as one measure of the density of the active material in the electrode, i.e., the packing property. The weight capacity density of the active material is the available discharge capacity measured as described above. Thus, in the examples of the present invention, as an evaluation measure of the electrode capacity density, the "electrode capacity density $\rho$" is defined and calculated as the product between the pressed density and the available discharge capacity.

Figure 6A:
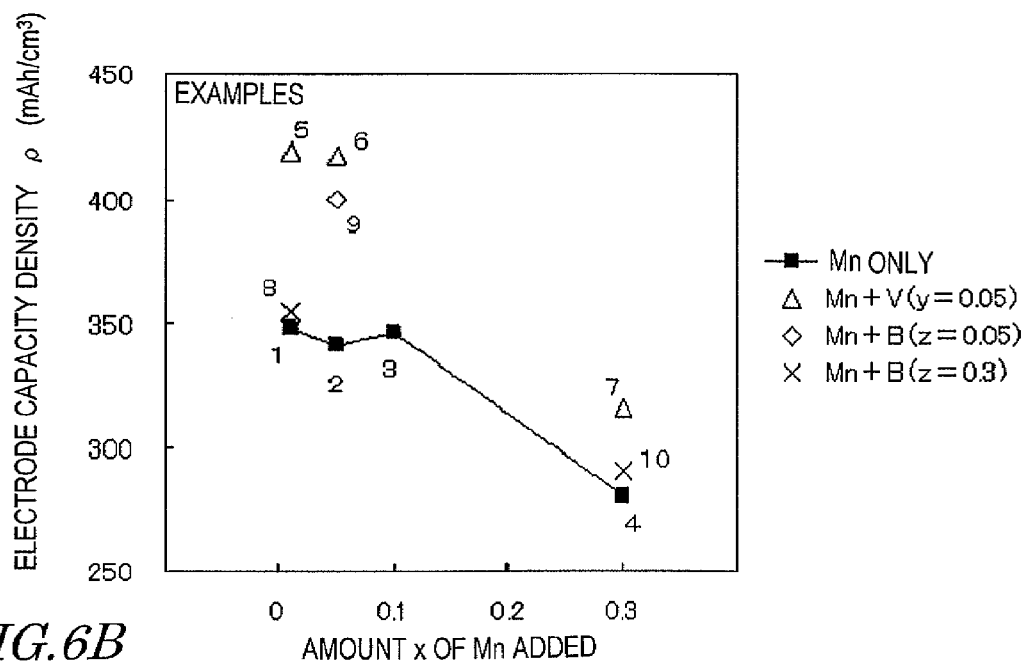
FIG. 6A is a graph showing the relationship between the electrode capacity density and the amount of Mn added for batteries containing active materials of Examples 1-10.
Figure 6B:
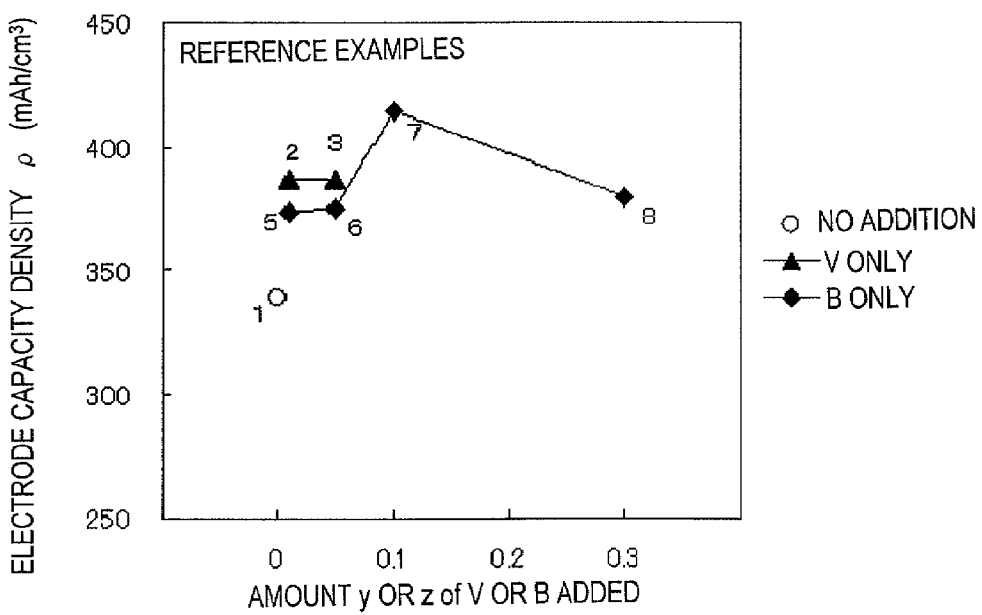
FIG. 6B is a graph showing the relationship between the electrode capacity density and the amount of B or V added for batteries of Reference Examples 1-3 and 5-8.

Table 2 shows the results of the "electrode capacity density $\rho$" for batteries containing the active materials of Examples 1-10 and Reference Examples 1-3 and 5-8 obtained as described above. FIG. 6A shows the relationship between the calculation results and the amount of Mn added for the batteries containing the active materials of Examples 1-10. FIG. 6B shows the relationship between the calculation results and the amount of V or B added for the batteries of Reference Examples 1-3 and 5-8.

It can be seen from FIG. 6A that the "electrode capacity density $\rho$" is greater than that of the battery of Reference Example 1 when the amount x of Mn element added is greater than 0 and less than or equal to 0.1. It can also be seen that the "electrode capacity density $\rho$" decreases for batteries containing the active materials of the examples when the amount x of Mn element added is 0.3. It is believed that this is because the discharge reversible capacity decreases significantly when the amount x of Mn element added is 0.3 (FIG. 4A). Therefore, it can be seen that it is more preferred that the amount x of Mn element added satisfies $0<x\leq0.1$.

It was also shown that the "electrode capacity densities $\rho$" of batteries containing the active materials Examples 5, 6, 8 and 9 with B element or V element added thereto were greater than those of the batteries containing the active materials of Examples 1-4. It is believed that this is because although the available discharge capacity decreases in accordance with the amounts of B element and V element added, the effect of increasing the pressed density has a significant contribution. The results of Reference Examples 2, 3 and 5 to 8, with respect to Reference Example 1, also have a similar tendency.

Negative electrode active materials for lithium ion secondary batteries according to the embodiments of the present invention, when used as an electrode, give high output characteristics and a high capacity density, and are useful as negative electrode active materials for lithium ion secondary batteries for mobile applications. They can also be used for applications such as large batteries, electric vehicles, etc.

A person of ordinary skill in the art will understand that various changes and/or modifications can be made to the prevent invention as illustrated by specific embodiments set forth above, without departing from the sprit and scope of the invention broadly defined herein. Thus, the embodiments are in any respect illustrative of the present invention and not limiting thereof. Other features and aspects of the present invention will be appreciated by a person of ordinary skill in the art upon reading and understanding the disclosure herein. It is clear that expected changes and modifications to such features, aspects, and reported results and examples are included within the scope of the present invention, which is only defined by the appended claims.

What is claimed is:

1. A negative electrode active material for a lithium ion secondary battery, containing a spinel-type lithium titanium complex oxide, wherein:
   the lithium anium complex oxide includes lithium, titanium, manganese, boron and oxygen, and
   the lithium titanium complex oxide includes manganese in an amount of more than 0 moles and 0.3 moles or less and boron in an amount of more than 0 moles and 0.3 moles or less, to 5 moles of elements included in the lithium titanium complex oxide other than lithium and oxygen.

2. The negative electrode active material for a lithium ion secondary battery according to claim 1, wherein the lithium titanium complex oxide has a composition expressed as $Li_4Ti_{5-x-z}Mn_xB_zO_{12}$, where $0<x\leq0.3$ and $0<z\leq0.3$.

3. The negative electrode active material for a lithium ion secondary battery according claim 1, wherein an average particle size of primary particles of the lithium titanium complex oxide is 1 µm or more and 11 µm or less.

4. The negative electrode active material for a lithium ion secondary battery according to claim 2, wherein x satisfies $0<x\leq0.1$.

5. A method for producing a negative electrode active material for a lithium ion secondary battery, comprising the steps of:
   mixing together a lithium source selected from LiOH, LiOH hydrates and $Li_2CO_3$ a titanium oxide having an anatase crystalline structure, one or more Mn sources selected from $MnO_2$ and $MnCO_3$, and one or more additive materials selected from $B_2O_3$, $H_3BO_3$ and $V_2O_5$ to make a mixture including at least lithium, titanium and manganese; and
   calcining the mixture at a temperature of 700° C. or more and 1000° C. or less so as to obtain so as to obtain a lithium titanium complex oxide including at least lithium, titanium and manganese, wherein:

the mixture further includes boron, and
the mixture has mole ratios of Li:Ti:Mn:B=4:(5−x−z):x:z, where $0<x\leq0.3$, and $0<z\leq0.3$.

* * * * *

UNITED STATES PATENT AND TRADEMARK OFFICE
CERTIFICATE OF CORRECTION

| | | |
|---|---|---|
| PATENT NO. | : 9,065,148 B2 | Page 1 of 1 |
| APPLICATION NO. | : 13/371032 | |
| DATED | : June 23, 2015 | |
| INVENTOR(S) | : Natsumi Goto et al. | |

It is certified that error appears in the above-identified patent and that said Letters Patent is hereby corrected as shown below:

In the Claims:

At column 18, claim number 1, line number 35, delete "anium", and insert -- titanium --

Signed and Sealed this
Twenty-sixth Day of January, 2016

Michelle K. Lee
*Director of the United States Patent and Trademark Office*